(12) United States Patent
Owen

(10) Patent No.: US 10,381,942 B1
(45) Date of Patent: Aug. 13, 2019

(54) BALANCING POWER DISTRIBUTION

(75) Inventor: David Owen, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1334 days.

(21) Appl. No.: 13/270,721

(22) Filed: Oct. 11, 2011

(51) Int. Cl.
*H02M 5/458* (2006.01)

(52) U.S. Cl.
CPC .......... *H02M 5/458* (2013.01); *H02M 5/4585* (2013.01)

(58) Field of Classification Search
CPC .......... G05F 5/00; G05F 1/56; H02M 5/4585; H02M 5/458; H02M 2001/0009
USPC ............. 363/34, 36, 37, 49, 125, 40, 41, 44, 363/56.03; 323/237–246, 299–303; 307/24, 52
See application file for complete search history.

(56) References Cited

U.S. PATENT DOCUMENTS

| | | | | |
|---|---|---|---|---|
| 7,919,941 | B2 * | 4/2011 | Aoyagi | H02M 7/53873 318/255 |
| 8,410,638 | B2 * | 4/2013 | Johnson, Jr. | 307/105 |
| 2005/0281067 | A1 * | 12/2005 | Deng et al. | 363/131 |
| 2009/0125158 | A1 * | 5/2009 | Schweitzer et al. | 700/293 |
| 2010/0054004 | A1 * | 3/2010 | Royak et al. | 363/125 |
| 2011/0043042 | A1 * | 2/2011 | Klikic et al. | 307/66 |
| 2012/0069612 | A1 * | 3/2012 | Hasler | 363/71 |
| 2012/0205982 | A1 * | 8/2012 | Navarro et al. | 307/66 |

\* cited by examiner

*Primary Examiner* — Yusef A Ahmed
*Assistant Examiner* — Shahzeb K Ahmad
(74) *Attorney, Agent, or Firm* — Harrity & Harrity, LLP

(57) ABSTRACT

A device determines a first current, of a first input phase of a power system, and a second current, of a second input phase of the power system. The device determines whether the first input phase and the second input phase are balanced based on the first current and the second current. When the first input phase and the second input phase are not balanced, the device selects the first input phase and an output phase of the power system. The device balances the first input phase and the second input phase by using the first input phase and the output phase.

20 Claims, 4 Drawing Sheets

BALANCING POWER DISTRIBUTION

BACKGROUND

Power distributions systems usually employ multiple phases to receive power for a load. Since a power distribution system usually powers a load that is not designed to pull power equally from each phase, an imbalance occurs between the amounts of power that are pulled from the different phases. The imbalance decreases efficiency of how the power is used, wastes resources of the power infrastructure, and over stresses components (e.g., copper wires, transformers, capacitor banks, breaker panels, etc.) that are distributing the power.

Currently, smart power distribution units (PDUs) are being increasingly used to increase energy efficiency of smart grids, data centers, buildings, etc. by turning off power to particular devices at particular points in time. However, simultaneously, these smart PDUs exacerbate problems associated with imbalance of power in power distribution systems.

SUMMARY

According to one aspect, a method may include: determining, by a device, a first current of a first input phase of a power system; determining, by the device, a second current of a second input phase of the power system; determining, by the device, whether the first input phase and the second input phase are balanced based on the first current and the second current; selecting, by the device, the first input phase when the first input phase and the second input phase are not balanced; selecting, by the device, an output phase, of the power system, when the first input phase and the second input phase are not balanced; and balancing, by the device, the first input phase and the second input phase by using the first input phase and the output phase.

According to another aspect, a system may include a balancing device. The balancing device may determine whether a first input phase, a second input phase, and a third input phase are balanced and select a first set of input phases when the first input phase, the second input phase, and the third input phase are not balanced. The first set of input phases may include one or more of the first input phase, the second input phase, or the third input phase. The balancing device may further select a first set of output phases when the first input phase, the second input phase, and the third input phase are not balanced; draw first power from the first set of input phases; convert the first power into a second power; and inject the second power into the first set of output phases.

According to yet another aspect, a system may include a balancing device. The balancing device may receive a first input of power via a first input phase; receive a second input of power via a second input phase; receive a third input of power via a third input phase; determine whether the first input phase, the second input phase, and the third input phase are balanced based on the first input of power, the second input of power, and the third input of power; and select a set of input phases when the first input phase, the second input phase, and the third input phase are not balanced. The first set of input phases may include one or two of the first input phase, the second input phase, or the third input phase. The balancing device may balance the first input phase, the second input phase, and the third input phase by drawing a type of power from the first set of input phases.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

An embodiment, described herein, may balance power distribution of a power distribution system. For example, a device may determine whether an imbalance exists between amounts of currents of different input phases of a power distribution system. If the imbalance exists, the device may select one or more of the input phases and one or more output phases of the power distribution system. The device may eliminate the imbalance by injecting power from the selected input phases into the selected output phases until the amounts of the currents of the different input phases are balanced. As a result, the device may reduce the imbalance, and related problems, in the power distribution system. For example, eliminating the imbalance may reduce imbalanced power distribution in the power distribution system, may increase efficiency by decreasing power losses by copper components and transformers of the power distribution system, and may reduce costs (e.g., power infrastructure building costs, labor costs, etc.) associated with correcting problems caused by over stressing components of the power distribution system.

Figure 1:
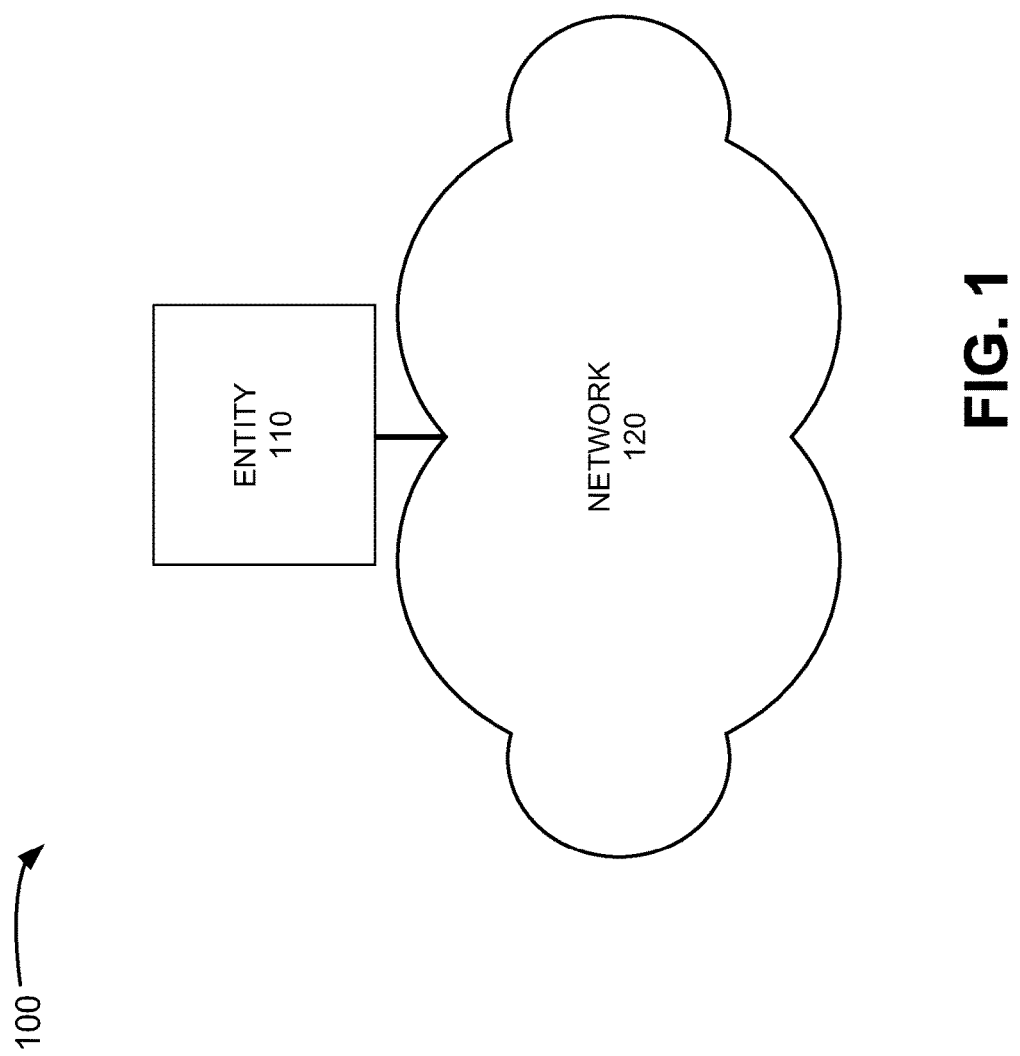
FIG. 1 is a diagram of an example environment in which systems and/or methods described herein may be implemented.

FIG. 1 is a diagram of an example environment 100 in which systems and/or methods described herein may be implemented. As shown in FIG. 1 environment 100 may include an entity 110 and a network 120. Entity 110 may include any facility that receives power from a power source outside of entity 110. For example, entity 110 may include a building, a data center, a manufacturing facility, etc. Entity 110 may house communication elements (e.g., routers, switches, etc.), commercial processing devices, commercial storage devices, commercial power storage systems, and/or one or more other types of components that utilize power received from outside of entity 110. Additionally, or alternatively, entity 110 may include a power distribution system, an example of which is described below with reference to FIG. 2. The power distribution system may receive the power from outside of entity 110 and distribute the power to devices within entity 110.

Network 120 may include the Internet, an ad hoc network, a local area network (LAN), a wide area network (WAN), a metropolitan area network (MAN), a cellular network, a public switched telephone network (PSTN), any other network, or a combination of networks. A device, within entity 110, may receive information (e.g., instructions to shut down another device within entity 110) via network 120.

Figure 2:
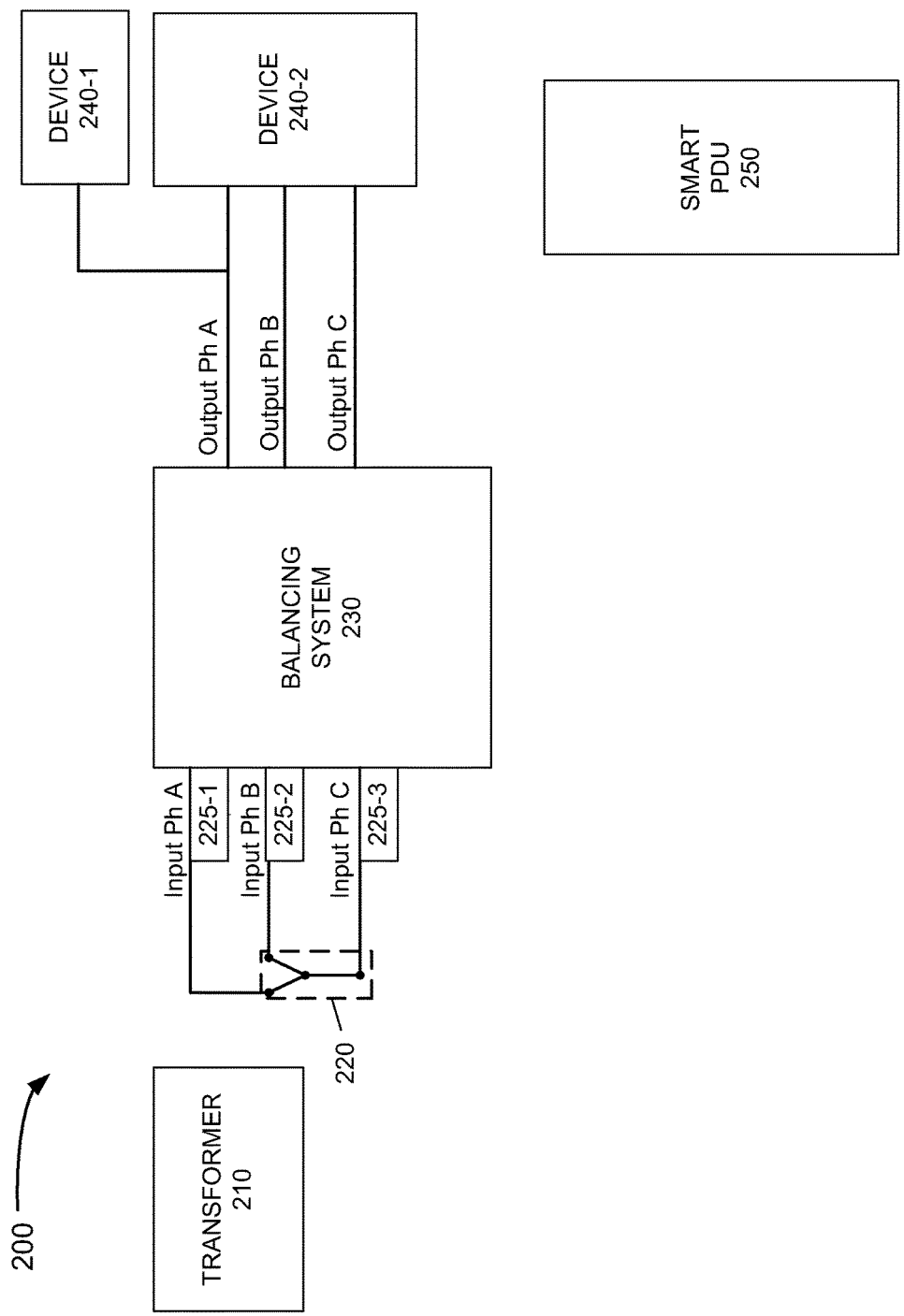
FIG. 2 is a diagram of an example power distribution system that may be used in the environment of FIG. 1.

FIG. 2 is a diagram of an example power distribution system 200. As described above, entity 110 may include power distribution system 200. For example, as shown in FIG. 2, power distribution system 200 may include a transformer 210, a wye ("Y"-shaped) winding structure 220, monitors 225-1, 225-2, and 225-3 (collectively referred to as "monitors 225" and generically as "monitor 225"), a balancing system 230, devices 240-1 and 240-2 (collectively referred to as "devices 240" and generically as "device 240"), and a smart PDU 250.

One transformer 210, one wye winding structure 220, three current monitors 225, one balancing system 230, two devices 240, and one smart PDU 250 have been illustrated in FIG. 2. In practice, there may be more transformers 210, wye winding structures 220, current monitors 225, balancing systems 230, devices 240, and smart PDUs 250. Furthermore, power distribution system 200 may include additional types of components, fewer components, different components, or differently arranged components than are shown in FIG. 2. Also, one or more components of power distribution system 200 may perform the tasks described as being performed by one or more other components of power distribution system 200.

Transformer 210 may include any component that is able to transfer electrical energy from one circuit to another circuit through transformer coil(s). In one implementation, transformer 210 may include a delta to wye (Δ-Y) transformer. Transformer 210 may receive/draw a particular amount of power (e.g., 480 alternating current (AC) voltage) at an entrance of entity 110 from a power source outside of entity 110. Transformer 210 may divide the received power into multiple phases of electric power via wye winding structure 220. The multiple phases may include, for example, input phase A (input Ph A), input phase B (input Ph B), and input phase C (input Ph C) (collectively referred to as "the input phases"). Transformer 210 may use wye winding structure 220 to transmit power via the input phases to balancing system 230. Initially, each one of input phase A, input phase B, and input phase C may equal a particular amount of power (e.g., 277 AC voltage and 20A or 30A standard circuit).

Monitor 225 may include any component that is able to measure a current of a phase (e.g., input phase A). In one implementation, monitor 225 may provide the measurement to balancing system 230. In another implementation, balancing system 230 may include monitors 225.

Balancing system 230 may include any component that is able to provide power to devices 240 and/or balance currents of phase A, phase B, and phase C. In one implementation, balancing system 230 may include an AC/direct current (DC) converter, a battery, a DC/AC converter, and/or a balancing device. The AC/DC converter may receive, via wye winding structure 220, input phase A, input phase B, and input phase C from transformer 210. The AC/DC converter may convert a received AC voltage (e.g., 277 AC voltage) into a DC voltage. The battery may store a particular amount of power. The DC/AC converter may receive converted DC voltage from the AC/DC converter. The DC/AC converter may convert the received DC voltage into another AC voltage. The DC/AC converter may output the AC voltage as output phase A (output Ph A), output phase B (output Ph B), and output phase C (output Ph C) collectively referred to as "the output phases"). Devices 240 may receive power, via the output phases, from balancing system 230.

The balancing device, of balancing system 230, may include a computing device, which includes a processor and/or a memory. The balancing device may determine whether input phase A, input phase B, and input phase C are balanced, and may initiate a process to balance the phases when they are not balanced.

Device 240 may include any device that utilizes power received from balancing system 230. Device 240 may include a network device (e.g., such as a router, a server, or a switch), a computing device, a communication device, etc. Device 240 may receive power via one or more of the output phases. For example, as shown in FIG. 2, device 240-1 may receive power from output phase A, and device 240-2 may receive power from one or more of output phase A, output phase B, or output phase C.

Smart PDU 250 may include a device that determines how and/or whether to provide power to devices 240 within power distribution system 200. In one implementation, devices 240 may receive power from balancing system 230 via smart PDU 250. Smart PDU 250 may receive instructions regarding how to supply power to devices 240 from, for example, network 120. In one example, smart PDU 250 may receive an instruction not to supply power to device 240-1 during a particular period of time (e.g., 11:00 PM-6:00 AM). In another example, smart PDU 250 may receive another instruction to only supply power to device 240-2 from output phase A and output phase B (and not from output phase C). Smart PDU 250 may allow power to be supplied, from balancing system 230 and via the output phases, to devices 240 based on the instructions. An imbalance may occur, for example, when power is supplied to device 240-1 and/or when power is not supplied from all the phases to device 240-2.

Figure 3:
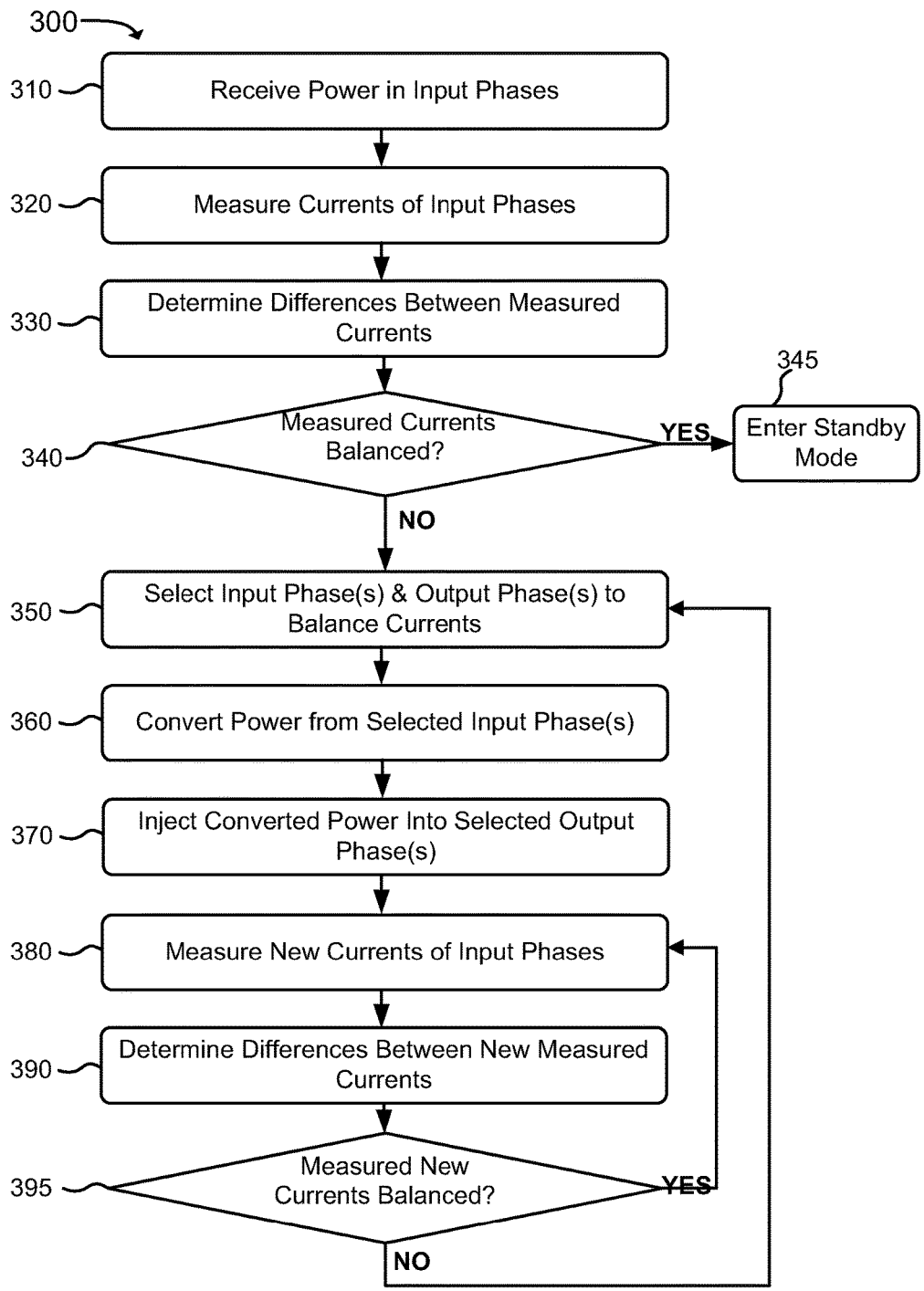
FIG. 3 is a flow chart of an example process for balancing power distribution.

FIG. 3 is a flowchart of an example process 300 for balancing power distribution. In one implementation, balancing system 230 may perform process 300. Alternatively, some or all of process 300 may be performed by one or more other devices and/or one or more other components, alone or in combination with balancing system 230.

As shown in FIG. 3, process 300 may include receiving power from input phases (block 310) and measuring currents of the input phases (block 320). In one implementation, balancing system 230 may receive power from transformer 210 in multiple phases, such as input phase A, input phase B, and input phase C. Balancing system 230 may measure a current and/or a voltage of each one of the inputs of power. For example, assume that balancing system 230 measures a current of 0 amps for input phase A, a current of 10 amps for input phase B, and a current of 10 amps for input phase C. In another implementation, monitors 225 may measure currents of each one of input phase A, input phase B, and input phase C. Balancing system 230 may receive the current measurements from monitors 225.

Process 300 may further include determining a difference between the measured currents (block 330) and determining whether the measured currents are balanced (block 340). For example, balancing system 230 may determine a difference between the highest measured current (e.g., 10 amps) of one of the phases (e.g., of input phase B or input phase C) and the lowest measured (e.g., 0 amps) current of another one of the phases (e.g., of input phase A). In one implementation, balancing system 230 may determine that the measured currents are balanced when the measured currents are equal to one another (i.e., when the determined difference(s) are equal to 0).

In another implementation, balancing system 230 may determine that the measured currents are balanced when the measured currents are within a particular percentage (e.g., 5% percent) of one another. In this example, balancing system 230 may determine that the measured currents are not balanced because the determined difference (e.g., 10 amps) between the measured current of input phase A and input phase B or input phase C is greater than 5%.

If the measured currents are balanced (block 340—YES), process 300 may include entering a standby mode (block 345). For example, when all components, except balancing system 230, of power distribution system 200 are powered-off, balancing system 230 may determine that the measured currents are balanced. After balancing system 230 determines that the measured currents are balanced, balancing system 230 may enter a standby mode in order to reduce power consumption of balancing system 230. Balancing system 230 may enter the standby mode for a particular period of time (e.g., 10 hours). Balancing system 230 may restart process 300 after the particular period of time and/or when a particular event occurs (e.g., device 240 or smart PDU 250 is powered on).

If the measured currents are not balanced (block 340—NO), process 300 may include selecting one or more input phases and one or more output phases to balance the currents (block 350). For example, as described above, after determining that the measured currents of the input phases are not balanced (e.g., because the measured currents are not within a particular percentage of one another), balancing system 230 may select a set of input phases and a set of output phases to balance the currents, as described further below with reference to FIG. 4. The set of input phases may include one or more of input phase A, input phase B, or input phase C. The set of output phases may include one or more of output phase A, output phase B, or output phase C. In one example, assume that the measured currents are not balanced because smart PDU 250 turned on device 240-1 and/or because smart PDU 250 indicated that device 240-2 does not need to receive power in one of the output phases.

Process 300 may also include converting power from the selected input phases (block 360) and injecting the converted power into the selected output phases (block 370). For example, balancing system 230 may draw power from the selected input phase(s) (e.g., input phase B and/or input phase C) to get an incremental power needed to balance the currents. Thereafter, balancing system 230 may convert the drawn power, and may inject the converted power into the selected output phases (e.g., output phase A).

After injecting the converted power into the selected output phases, process 300 may include measuring new currents of the input phases (block 380), determining differences between the measured new currents (block 390), and determining whether the measured new currents are balanced (block 395). Balancing system 230 may measure the new currents of the input phases, determine differences between the measured new currents, and determine whether the measured new currents are balanced. A portion of process 300 that corresponds to blocks 380-395 may be similar to a portion of process 300 that is described above with reference to blocks 320-340.

If the measured new currents are balanced (block 395—YES), process 300 may include continuously re-measuring new currents of the input phases (block 380). For example, after determining that the measured new currents are balanced, balancing system 230 may repeat a portion of process 300 represented by blocks 380-395 until determining that the measured new currents are not balanced.

If the measured new currents are not balanced (block 395—NO), process 300 may include, again, selecting one or more input phases and one or more output phases to balance the (new) currents (block 350). For example, after determining that the measured new currents are not balanced, balancing system 230 may adjust the new currents to balance the currents between the phases. In other words, balancing system 230 may select the same and/or different input phases and/or output phases, and/or may draw and/or inject different amounts of power as necessary to balance the currents. Balancing system 230 may repeat a portion of process 300 represented by blocks 350-395 until determining that the measured new currents are balanced (block 395—YES). Once balance is achieved, balancing system 230 provides power, in the output phases, to devices 240.

Figure 4:
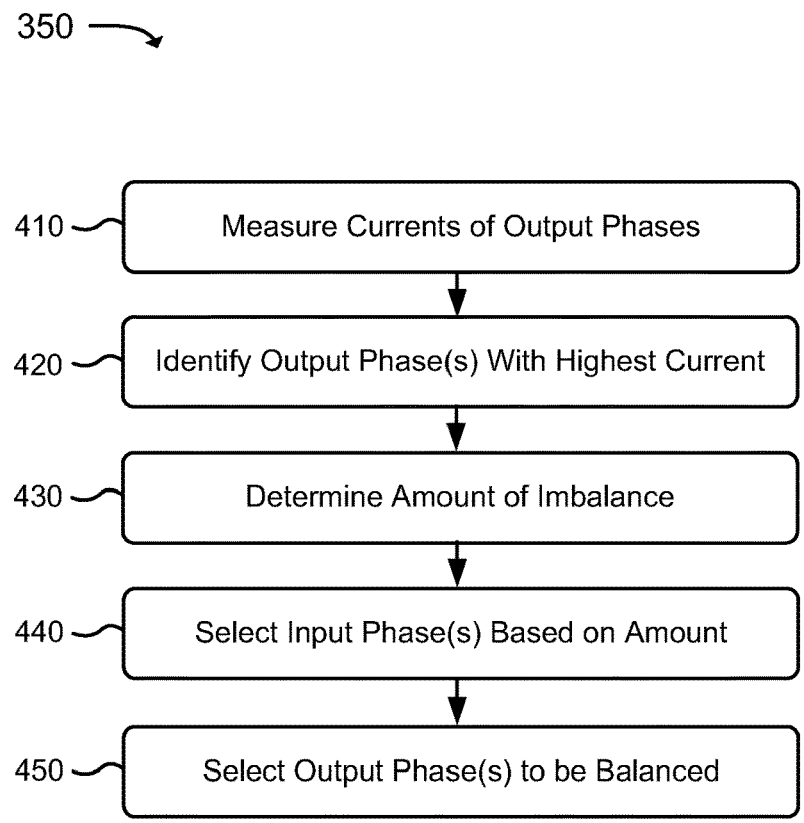
FIG. 4 is a flow chart of an example process for selecting input phases and output phases that are used to balance power distribution.

Block 350 may include the process block depicted in FIG. 4. As shown in FIG. 4, block 350 may include measuring currents of output phases (block 410) and identifying one or more output phases with highest current (block 420). For example, after determining that the measured currents of the input phases are not balanced, balancing system 230 may measure a current of each one of output phase A, output phase B, and output phase C. Balancing system 230 may identify, based on the measurements, one or more output phases with a measured current that is higher than a measured current of the other output phase(s). For example, assume that the one or more output phases include output phase B and output phase C and that the measured current of the one or more output phases is equal to 15 amps. Furthermore, assume that the other output phase is output phase A and that the measured current of other output phase is equal to 0 amps.

Block 350 may further include determining an amount of imbalance (block 430), selecting one or more input phases based on the amount (block 440), and selecting one or more output phases to be balanced (block 450). For example, balancing system 430 may determine an amount of imbalance between the different phases that needs to be balanced based on the measured currents of the input phases and/or based on the measured currents of the output phases. If the amount of the imbalance is below a particular threshold, balancing system 430 may select only one input phase, of the three input phases, to balance out the amount of the imbalance. If the amount of the imbalance is too high (e.g., above the particular threshold), balancing system 430 may select two input phases, of the three input phases, to balance out the amount of the imbalance. Thereafter, balancing system 430 may determine whether to select one or two output phases that need to be balanced, with the power from the selected input phases, in order to eliminate/decrease the amount of imbalance. As described about with reference to blocks 360 and 370 of FIG. 3, balancing system 430 may draw power from the selected input phases and inject power into the selected output phases in order to balance currents of the different phases.

The foregoing description of implementations provides illustration and description, but is not intended to be exhaustive or to limit the implementations to the precise form disclosed. Modifications and variations are possible in light of the above teachings or may be acquired from practice of these implementations.

For example, while series of blocks have been described with regard to FIGS. 3 and 4, the order of the blocks may be modified in other implementations. Further, non-dependent blocks may be performed in parallel. Also, a number of input and/or output phases could be greater or less than 3.

While certain values have been used above (e.g., 480), these values are merely provided as examples. In other implementations, the values may differ.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a device, a first current of a first input phase of a power system;
   determining, by the device, a second current of a second input phase of the power system;
   determining, by the device, that the first input phase and the second input phase are not balanced based on the first current and the second current;
   selecting, by the device, the first input phase based on determining that the first input phase and the second input phase are not balanced;
   selecting, by the device, two output phases, of a plurality of output phases of the power system, based on determining that the first input phase and the second input phase are not balanced; and
   balancing, by the device, the first input phase and the second input phase by using the first input phase and the two output phases.

2. The method of claim 1, where balancing the first input phase and the second input phase by using the first input phase and the two output phases comprises:
   drawing first power from the first input phase,
   converting the first power into a second power, and
   injecting the second power into an output phase of the two output phases.

3. The method of claim 2, where, after injecting the second power into the output phase, balancing the first input phase and the second input further comprises:
   determining a first new current of the first input phase,
   determining a second new current of the second input phase,
   determining whether the first input phase and the second input phase are balanced based on the first new current and the second new current, and
   balancing, when the first input phase and the second input phase are not balanced based on the first new current and the second new current, the first input phase and the second input phase by using at least one of the first input phase or the second input phase and the output phase.

4. The method of claim 1, further comprising:
   entering into a standby mode for a particular period of time when the first input phase and the second input phase are balanced,
   where the device consumes less power after entering into the standby mode.

5. The method of claim 1, where determining the first current of the first input phase:
   receiving power from a transformer via the first input phase, and
   measuring the first current of the power.

6. The method of claim 1, further comprising:
   determining a third current of a third input phase of the power system,
   where balancing the first input phase and the second input phase further comprises using the third input phase.

7. The method of claim 1, where determining that the first input phase and the second input phase are not balanced comprises:
   determining that the first input phase and the second input phase are not balanced when a first amount of the first current is not within a particular percentage of a second amount of the second current.

8. The method of claim 1, where selecting the first input phase comprises:
   determining a third current of an output phase of the two output phases,
   determining an amount of imbalance, of the power system, based on at least two of the first current, the second current, or the third current, and
   selecting the first input phase based on the amount of imbalance.

9. A system comprising:
   a balancing device to:
   determine that a first input phase, a second input phase, and a third input phase are not balanced,
   select a first set of input phases based on determining that the first input phase, the second input phase, and the third input phase are not balanced,
   the first set of input phases including one or more of the first input phase, the second input phase, or the third input phase,
   select a first set of output phases, of a plurality of sets of output phases, based on determining that the first input phase, the second input phase, and the third input phase are not balanced,
   the first set of output phases including two output phases,
   draw first power from the first set of input phases,
   convert the first power into a second power, and
   inject the second power into the first set of output phases.

10. The system of claim 9, where, after injecting the second power, the balancing device is further to:
    determine, for a second time, that the first input phase, the second input phase, and the third input phase are not balanced,
    select a second set of input phases when the first input phase, the second input phase, and the third input phase are not balanced for the second time, select a second set of output phases, of the plurality of sets of output phases, when the first input phase, the second input phase, and the third input phase are not balanced for the second time, draw third power from the second set of input phases, convert the third power into a fourth power, and inject the fourth power into the second set of output phases.

11. The system of claim 10, where the second set of input phases comprise one or more of the first input phase, the second input phase, or the third input phase, and where the second set of output phases is different from the first set of output phases.

12. The system of claim 9, where the balancing device is further to:

enter into a standby mode for a particular period of time when the first input phase, the second input phase, and the third input phase are balanced, and where the balancing device consumes less power after entering into the standby mode.

13. The system of claim 9, further comprising:

a transformer to:

receive a first amount of voltage from outside of the system, split the first amount of voltage between the first input phase, the second input phase, and the third input phase, and provide the split first amount of voltage to the balancing device via the first input phase, the second input phase, and the third input phase.

14. The system of claim 9, where, when selecting the first set of input phases, the balancing device is to:

determine whether an amount of imbalance of the first input phase, the second input phase, and the third input phase satisfies a threshold, select only the first input phase for the first set of input phases when the amount of imbalance does not satisfy the threshold, and select the first input phase and the second input phase for the first set of input phases when the amount of imbalance satisfies the threshold.

15. A system comprising:

a balancing device to:

receive a first input of power via a first input phase, receive a second input of power via a second input phase, receive a third input of power via a third input phase, determine that the first input phase, the second input phase, and the third input phase are not balanced based on the first input of power, the second input of power, and the third input of power, select a set of input phases based on determining that the first input phase, the second input phase, and the third input phase are not balanced, the set of input phases including one or more of the first input phase, the second input phase, or the third input phase, select a set of output phases, of a plurality of sets of output phases, when the first input phase, the second input phase, and the third input phase are not balanced, the set of output phases including two output phases, and balance the first input phase, the second input phase, and the third input phase by drawing a first type of power from the set of input phases and by using the set of output phases.

16. The system of claim 15, where, when determining that the first input phase, the second input phase, and the third input phase are not balanced, the balancing device is further to:

measure a first current of the first input of power, measure a second current of the second input of power, measure a third current of the third input of power, and determine that the first input phase, the second input phase, and the third input phase are not balanced based on differences between the first current, the second current, and the third current.

17. The system of claim 15, where, when using the set of output phases, the balancing device is to:

convert the first type of power into a second type of power, and inject the second type of power into the set of output phases.

18. The system of claim 15, where the balancing device is further to:

enter into a reduced power mode for a particular period of time when the first input phase, the second input phase, and the third input phase are balanced.

19. The system of claim 15, where, when selecting the set of input phases, the balancing device is to:

determine an amount of imbalance between the first input phase, the second input phase, and the third input phase, select one of the first input phase, the second input phase, or the third input phase when the amount of imbalance is below a particular threshold, and select two of the first input phase, the second input phase, or the third input phase when the amount of imbalance is not below the particular threshold.

20. The system of claim 15, where the system further comprises:

an alternating current (AC)/direct current (DC) converter to convert the first input of power, the second input of power, and the third input of power from AC voltage into DC voltage, and a DC/AC converter to convert the DC voltage into different AC voltage.

* * * * *